US006757904B1

(12) United States Patent
Woodruff et al.

(10) Patent No.: US 6,757,904 B1
(45) Date of Patent: Jun. 29, 2004

(54) FLEXIBLE INTERFACE FOR COMMUNICATING BETWEEN OPERATING SYSTEMS

(75) Inventors: Bryan A. Woodruff, Redmond, WA (US); George H. J. Shaw, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/522,569

(22) Filed: Mar. 10, 2000

(51) Int. Cl.[7] ................................................. G06F 9/00
(52) U.S. Cl. ...................................................... 719/319
(58) Field of Search ........................................ 719/319

(56) References Cited

U.S. PATENT DOCUMENTS

| | | | | |
|---|---|---|---|---|
| 5,440,740 A | * | 8/1995 | Chen et al. | 709/104 |
| 5,724,583 A | * | 3/1998 | Carmon et al. | 709/100 |
| 6,338,130 B1 | * | 1/2002 | Sinibaldi et al. | 712/35 |

OTHER PUBLICATIONS

Simons ABB/IDES Client Server Interface Function Design Manual Version 1.02, Jul., 1999.*
Crone et al , Inter and Intra–IOM Message Passing in the DAQ–unit, Apr. 11, 1997.*
"TMS320C4X User's Guide (Chapter Two)", May 1999, Texas Instruments Incorporated. Available at http://www.ti.com/sc/docs/psheets/man_dsp.htm.
Chapter 2, Architectural Overview, TMS 320 Family and the TMS320C4x, 30 pages.

* cited by examiner

Primary Examiner—Meng-Al T. An
Assistant Examiner—LeChi Truong
(74) Attorney, Agent, or Firm—Leydig, Voit & Mayer

(57) ABSTRACT

A method and system for communicating between operating systems using an interface that provides an abstraction layer of one of the operating systems. At least one channel is created that allows messages and data packets to be transferred between the operating systems without converting the data into an operating system's format before sending the data to another operating system. The interface provides commands for each of the operating systems to use to communicate with each other and provides the flexibility to create platform specific extensions to the provided commands. The interface also allows a first operating system to demand load devices on a second operating system by extending demand load functionality of the second operating system to the first operating system. A second channel is created that is used to only send data and data related control messages on the channel, eliminating the need to distinguish between general control messages and data specific control message.

28 Claims, 3 Drawing Sheets

Fig. 4
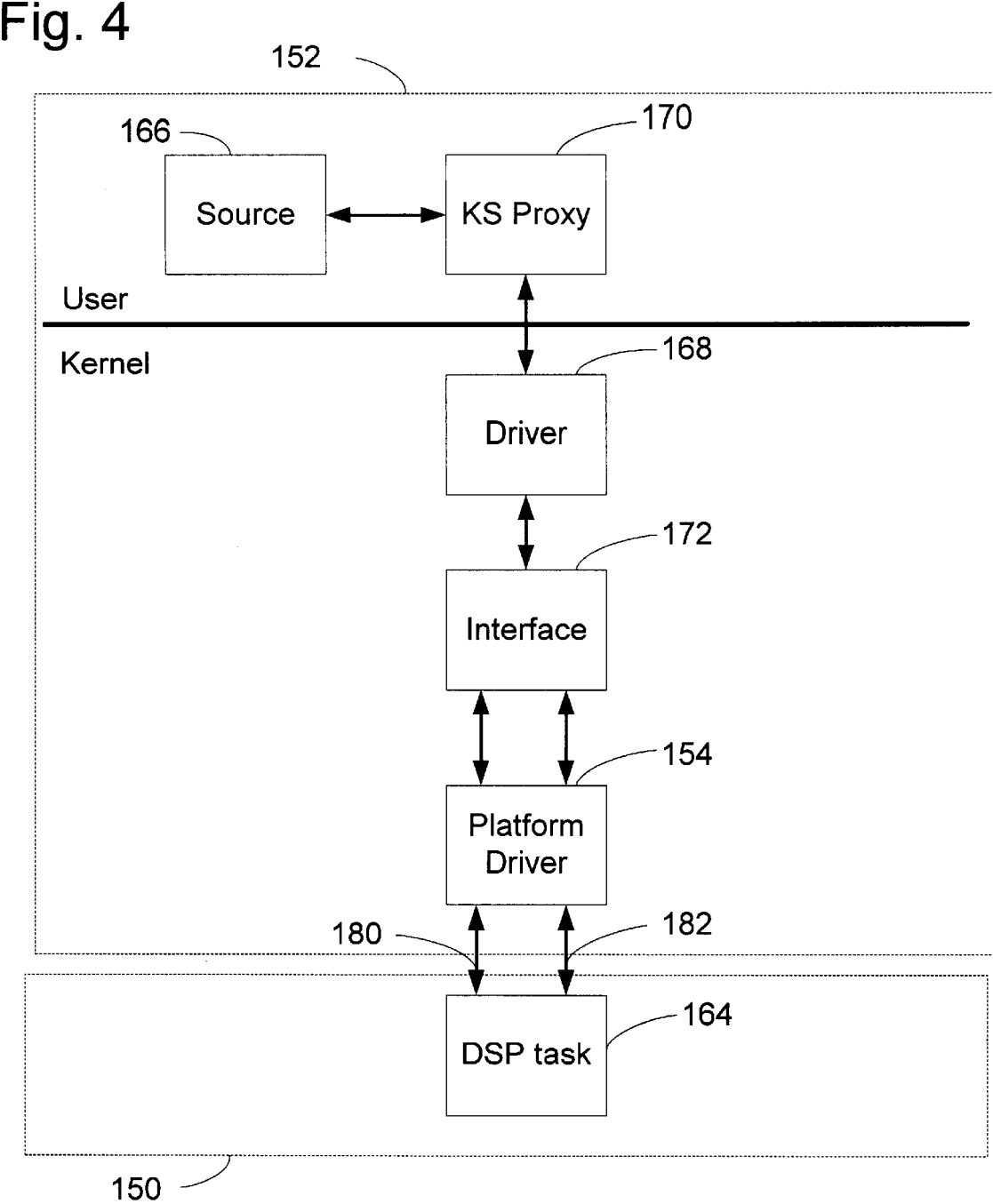
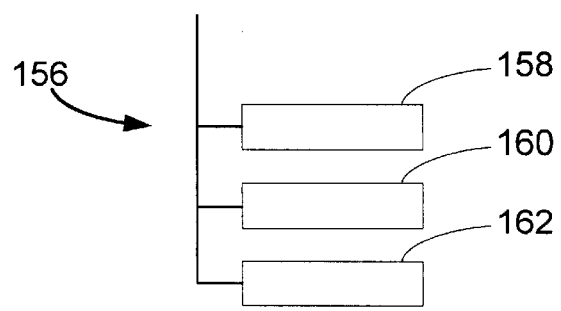
Fig. 5

FLEXIBLE INTERFACE FOR COMMUNICATING BETWEEN OPERATING SYSTEMS

TECHNICAL FIELD

This invention relates generally to communication and data transfer between operating systems and, more particularly, relates to a system and method for transferring data between operating systems involving an abstraction layer.

BACKGROUND OF THE INVENTION

Continued advances in computer technology have lead to not only increased performance, but also increased performance expectations by the users of such computer equipment. These increased user expectations extend not only to processing capability, but also to all aspects and peripheral equipment associated with a home or business computing environment. The industry has responded with increased speed for CD ROM drives, communication modems, faster video and audio cards, and even faster processors. However, these advances in performance also increased the computational tasks the computer's operating system is required to perform to allow users to take the full advantage of these performance enhancements.

For example, in areas such as multimedia and audio compression, a technique known as streaming was developed for transferring data so that it can be processed as a steady and continuous stream. Streaming technologies are becoming increasingly important with the growth of the Internet because most users do not have fast enough access to download large multimedia files quickly. With streaming, the data can start to be displayed before the entire file has been transmitted. For streaming to work, the data must be processed as a steady stream and converted to audio or video. If the data isn't processed quickly enough, however, the presentation of the data will not be smooth. The processing of this data requires a large number of computations that can load down the computer's operating system, consume a significant amount of the computer's resources, and incur additional latency. These effects degrade performance.

In response, the industry developed operating systems designed specifically to perform these types of computational heavy tasks in order to free up the computer's resources and reduce latency. The digital signal processor (DSP) is the most prevalent type of processor designed to perform these tasks. It is recognized that DSPs can be used in areas such as video cards, audio cards, telecommunication devices, automotive applications, industrial applications, and any other application where an electronic controller is used. Many of these DSPs are installed as add-ons to a computer. As new advancements and improvements are made, these DSPs are readily changed to handle the computations necessary to support the advancements and improvements. However, it was soon realized that DSPs introduced a new problem in that DSPs have to communicate with the computer's operating system efficiently to move the data from the computer's operating system down to the DSP to allow the DSP to perform the computations and then send it back to the computer operating system or on to another device.

One prior solution that overcomes the communication problem is where each DSP developed its own interface to the computer's operating system that is specific to the DSP's particular operating system. However, while this particular interface is acceptable for that particular DSP, such an interface generally cannot be used with any other DSP as the interface is specific to features of that particular DSP. This required that multiple interfaces be developed, one for each type of DSP.

Another solution to the communication problem is the computer operating system providing a fixed driver for the DSP to communicate with the computer operating system. Since the fixed driver may not address all of the functions available through the DSP, this results in limiting the functionality of the DSP to the particular functions provided by the driver. This does not allow users to take advantage of the full capabilities of the DSP. Furthermore, as new features are added to the DSP, the fixed driver cannot support them and new drivers must be created.

There therefore exists a need in the art for a system and method that allows different types of operating systems to communicate with each other that can be generalized for all types of operating systems without limiting the capability of either operating system.

SUMMARY OF THE INVENTION

In view of the above described problems existing in the art, the present invention provides an interface of a computer operating system to enable other operating systems to communicate with the host computer operating system. This interface provides an abstraction layer of a first operating system for DSPs and other operating systems to communicate with the first operating system. Each operating system does not need to know every command of the other operating system. The interface provides basic communication commands for operating systems to use and provides the flexibility to add operating system specific parameters to the basic communication commands to allow additional functionality. In one embodiment, one of the operating systems abstracts the other operating system as a bus transport.

The interface enables control channels and data channels to be created to allow data to be passed between the operating systems without having to convert the data into another format. The control channel is used for exchanging control related messages and the data channel is used for transferring data and messages between the operating systems. The interface allows dynamic loading and unloading of tasks on the DSP to enable new tasks to be distributed and used on the DSP.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 is a block diagram illustrating data flow between a source residing in user mode on a first operating system, through kernel mode on a first operating system, and to a task residing on a second operating system;

FIG. 5 is a block diagram illustrating a portion of a registry entry in an operating system.

DETAILED DESCRIPTION OF THE INVENTION

Figure 1:
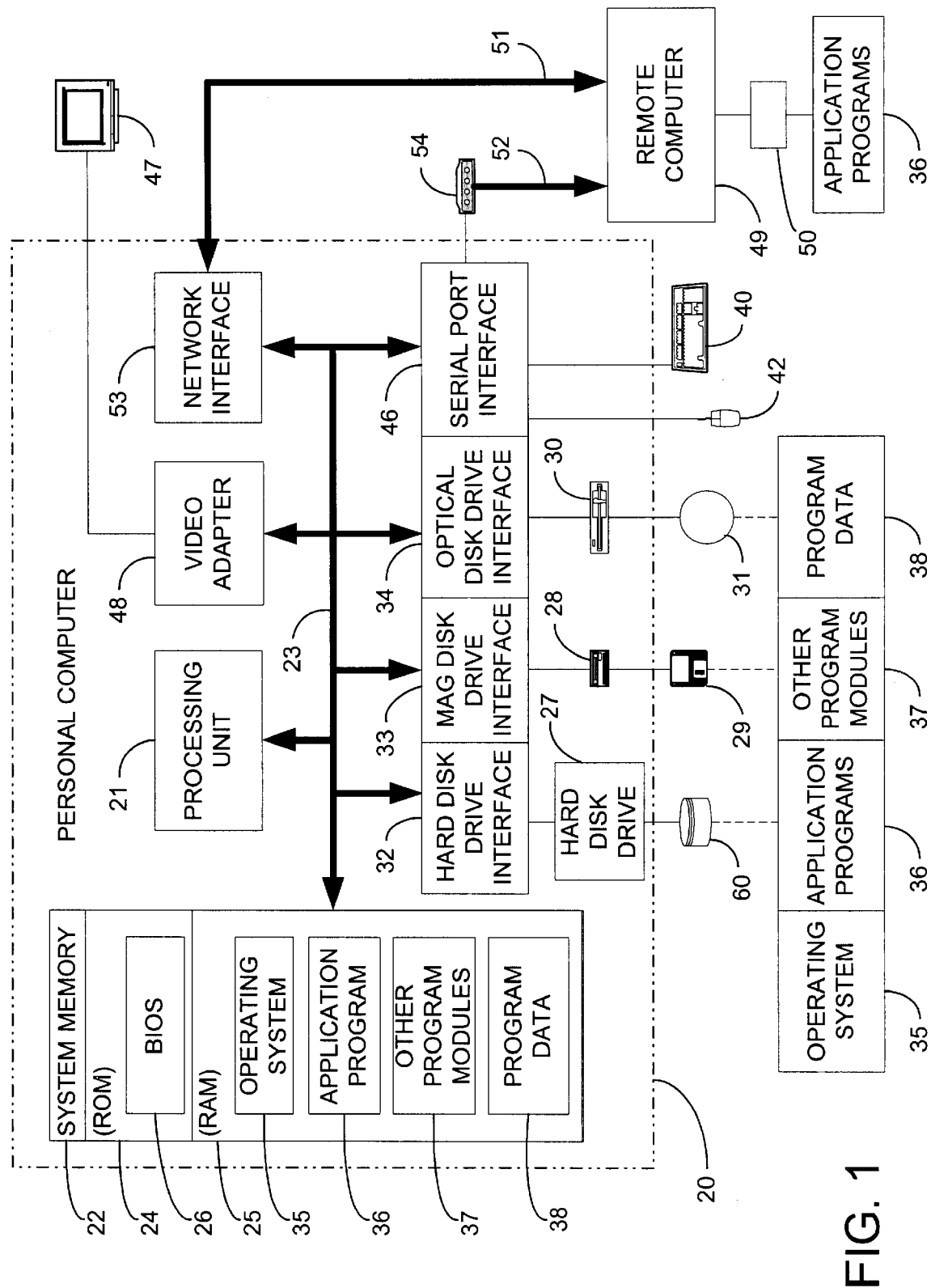
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
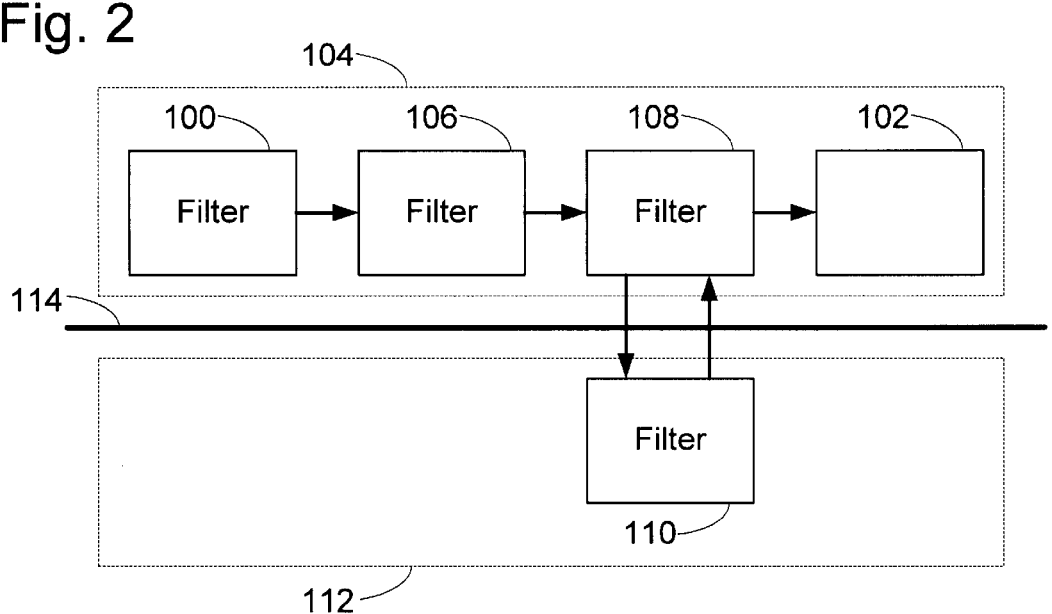
FIG. 2 is a block diagram illustrating data flow between operating systems using the interface of the invention.

In accordance with the invention, FIG. 2 shows a representative block diagram of data flow from a source 100 to an endpoint 102 in a first operating system 104. Between the source 100 and the endpoint 102, the data is transformed in some manner by operational blocks which are commonly known as filters. The data stream is moved from the source 100 to filter 106. The filter 106 performs some operation on the data and passes the data to filter 108. Filter 108 processes the data and the data is moved to the endpoint 102. In some circumstances, the operating system 104 may pass the data to a filter 110 residing on another operating system 112 through an interface 114 of the invention in order to reduce the overhead on operating system 104 or to have the second operating system perform some function that the second operating system is designed to do efficiently. The operating systems 104 and 112 may be any operating system, including home and business computer operating systems and operating systems contained in peripheral equipment including modems, printers, and audio and video cards. One such operating system wherein the invention can be used is the Windows operating system as provided by Microsoft Corporation.

Figure 3:
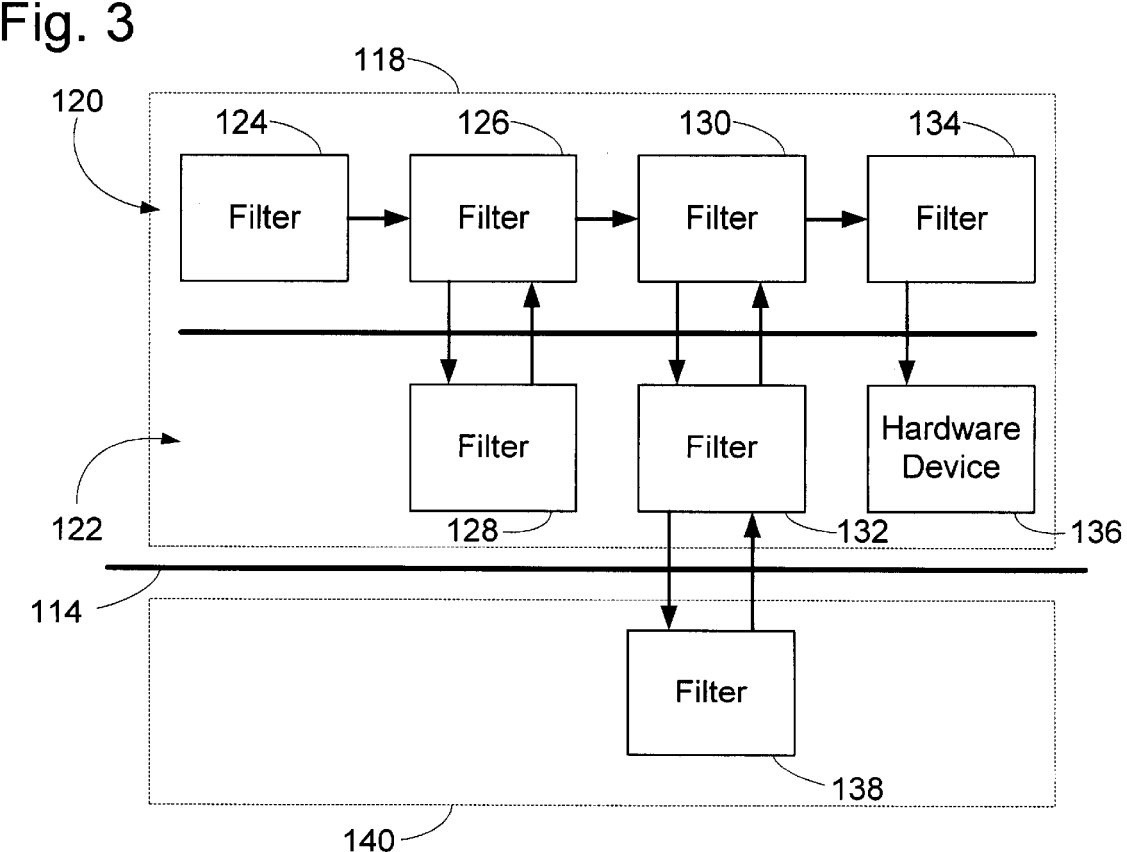
FIG. 3 is a block diagram illustrating an embodiment of an operating system employing the interface to transfer data between a user mode source and a task on another operating system using an interface.

Turning now to FIG. 3, the invention will be described in context to the Windows operating system. The Windows operating system 118 has a kernel mode 122 and a user mode 120. The kernel mode 122 allows access to all memory and all CPU instructions can be issued. The user mode 120 allows limited access to memory and a limited set of interfaces to CPU instructions. Filters reside in user mode 120 and in kernel mode 122. Data from an application or an external source or hardware is sent to filters for processing and then sent back to its source or on to hardware or another application or external operating system. FIG. 3 shows a representative example of data flow in the Windows operating system 118. Filter 124 residing in user mode 120 receives the data, transforms it in some manner and the data is sent to filter 126 for further transformation. Filter 126 transforms the data in some manner and the data is then sent to filter 130 for further transformation. The data could also be sent to filter 128 residing in kernel mode 122 for transformation prior to being sent to filter 130. Filter 130 does further transformation on the data and the data is sent to filter 134 for further transformation prior to being sent to hardware device 136. Data may be sent to filter 138 residing on an external operating system 140 for further transformation prior to being sent to filter 134. It should be noted that the data from an application or an external source or hardware can be sent directly to a filter or hardware device residing in kernel mode. The data can also be sent directly to the external filter 138 from the Windows operating system 118 and then back to a filter or a hardware device or an application or an external source.

One form of external operating system 140 that is widely used is Digital Signal Processing (DSP) operating systems. DSPs have been designed specifically to perform computationally heavy tasks, and are typically placed on cards or devices that are installed in computer systems running a host operating system such as Windows. For example, a video card or a sound card employing a DSP and installed in a computer generally has a real-time operating system on the card. It is recognized that DSPs can be used in areas such as video cards, audio cards, telecommunication devices, automotive applications, industrial applications, and any other application where an electronic controller is used. From hereon, the external operating system shall be called a DSP OS.

When a computational heavy task is required, the Windows operating system can send the data to the DSP OS to perform the data transformation.

Turning now to FIG. 4, the interface of the invention will be described in the context of the Windows operating system and a DSP OS. For the following description, exemplary commands of one embodiment shall be put in parentheses. See appendix 1 for the specific details of the exemplary command. Appendix 1 provides a listing of commands for one specific implementation of the invention. It should be noted that the command is not limited to the specific implementation of this embodiment and the invention is not limited to the commands of appendix 1 or to the Windows operating system or to a DSP OS.

When a DSP is first sensed by the Windows operating system 152, a platform driver 154 is loaded. These platform drivers are provided by the DSP OEM or independent software vendors. The platform driver 154 controls hardware and manages data transfers and messages down to the DSP OS 150. The platform driver 154 registers with the Windows operating system 152 and, as illustrated in FIG. 5, the Windows operating system 152 creates a tree 156 having identifiers 158 in a registry. These identifiers 158 include a device identification 160 and an interface identification 162 that identifies the tasks the DSP can perform. The registry also includes the pin identifications and pin types of the DSP filters. A portion of this information is obtained from platform driver 154 and the Windows operating system 152 generates the rest of the information as known by those skilled in the art. For example, in one embodiment, pin 0 of the DSP filter has pin ID 0 and may be an input pin of the MP3 type and pin 1 may have pin ID 1 and be an output pin that is 16 bit, 44 kHz stereo. In other embodiments, the DSP filter's pins may have different pin types. The Windows operating system 152 uses this information to load the appropriate platform driver 154 when an application or external source requests that a task be performed that the DSP has the capability to do.

In an alternate embodiment, the DSP OS 150 can also be installed as a bus on the Windows operating system 152 (KsCreateBusEnumObject). This provides the DSP OS 150 the capability to dynamically load other tasks it may require when performing the DSP task 164. This dynamic loading is known as demand loading. To provide the DSP OS 150 with demand load capability, the platform driver 154 requests the Windows operating system 152 to extend the capability to the platform driver 154 when the platform driver 154 is loaded (KsCreateBusEnumObject). Once this capability is provided, the Windows operating system 152 provides the necessary support to the platform driver 154 to dynamically load other devices the DSP OS 150 requests when the DSP OS 150 is performing the DSP task 164.

When a data source 166 requests the Windows operating system 152 to perform some DSP task 164 that resides on the DSP OS 150, the Windows operating system 152 loads a driver 168 that corresponds to the interface identification 162 (FIG. 5). The driver 168 serves as an interface between drivers residing on the user mode 120 and the Windows operating system 152. A user mode driver 170 is also loaded by the Windows operating system 152 to provide an interface between the data source 166 and the driver 168. The driver 168 loads an interface 172 that provides an interface between the Windows operating system and the DSP operating system. The user mode driver 170 and the driver 168 can be provided by independent software vendors and operating system OEMs.

Once the interface 172 is loaded, the driver 168 commands the interface 172 to create a control channel 180 (CreateDSPControlChannel). The control channel 180 is used to communicate with the DSP task 164 to perform general transactions. The interface 172 sends a load task message (KSDSP_MSG_LOAD_TASK) to the platform driver 154 to load the control channel 180. The platform driver 154 provides a task context object which identifies the DSP task 164 and which is opaque to all layers except the platform driver. The task context object has an associated control channel 180. The interface 172 then queries the platform driver 154 for the control channel identifiers and receives them (GetControlChannel). The control channel identifiers are opaque to other drivers and objects of the Windows operating system.

The Windows operating system 152 by default provides standard services to perform a number of routine operations on filter pins, filters, and filter topology properties on behalf on the driver 168. This default handling of the standard services can be extended to the interface 172 by a dynamically loaded module that is called when the DSP task 164 is instantiated or when a DSP filter's pin is instantiated (GetAutomationTable). The extension of the standard services can result in a more streamlined interface 172 because it does not need to emulate the standard services. The standard services are then combined with the operations not handled by the standard services. Operations not handled by the Windows operating system 152 are sent to the driver 168. Driver 168 then sends a message to the interface 172 which in turn sends a message to the platform driver 154 via property (KSDSP_MSG_PROPERTY), method (KSDSP_MSG_METHOD), and event (KSDSP_MSG_EVENT) messages to perform these operations.

Once the DSP task 164 is loaded and a control channel 180 is created, the driver 168 issues a translation command to convert any Windows operating system's identifications, such as the device identification 160 (FIG. 5) and interface identification 162 (FIG. 5), that are larger than a pre-selected size into identifiers of the pre-selected size (SetGuidTranslationTable). In one embodiment, the pre-selected size is preferably 32 bits in length. This reduces the size of control messages containing identifiers which reduces the memory footprint associated with the control message, resulting in less overhead in sending messages and data between the operating systems.

Communication between the Windows operating system 152 and the DSP task 164 are sent by preparing a message (PrepareChannelMessage, PrepareMessage) and sending the message (SendMessage). To prepare a message, a control message is sent to the DSP task 164 to notify it that a message is being sent. This message may include a pointer to an I/O request packet, a message identifier, a pointer to an allocated message frame or a pointer to receive the resultant message frame and the length of the message that will be sent. Other message specific parameters such as the identification of the target channel may also be sent in this message and whether the message is for general control or for a specific task. Alternatively, this message can allocate an I/O request packet or a message frame (AllocateMessageFrame) or both an I/O request packet and a message frame. The platform driver 154 receives this message and translates the message, if necessary, into the format required by the DSP task 164.

Providing the capability to identify whether the message is a general control message or a task specific message allows the DSP OS 150 to distinguish between message types. This provides the DSP OS 150 with the flexibility to be able to receive and send general control messages differently than for pin specific and data transfer control messages. For example, a general control message may have different parameters associated with it than data transfer control messages. Having the capability to send a general control message without any parameters specifically needed only to support data transfer control messages or to send a data transfer control message without any parameters specifically needed only for a general control message can result in more efficient communication between the DSP OS 150 and the Windows operating system 152.

After the operating systems have been notified that a message is being sent, the message is sent (SendMessage) to the DSP task 164. It should be noted that the notification and sending may be combined into a single step. This message may include indications that the driver 168 is waiting for the DSP task to perform an operation and the I/O request packet associated with the message, and other optional parameters that an operating system may require. This distinguishes from fixed drivers by allowing operating systems to put platform specific parameters in messages. The driver 168 retrieves results of messages sent by sending a message that requests the results. The message includes an identifier that identifies the message frame sent to the DSP task 164 (GetMessageResult).

Data is sent to the DSP task 164 on a separate data channel 182. Control messages may also be sent on a data channel 182. In one embodiment, only data related control messages such as start, run, and stop messages are sent on the data channel 182. This eliminates the operating systems from having to distinguish between general control messages and data related control messages. When a DSP filter's pin is instantiated, the driver sends a message to create a data channel and provides the pin identification and type of pin being created (OpenDataChannel). The message also provides a pointer to receive the identifier for the data channel being created. The platform driver 154 then commands the DSP task 156 to open a data channel 182 (KSDSP_MSG_OPEN_DATA_CHANNEL) and receives from the DSP task 164 an identifier that identifies the resultant data channel.

To transfer data streams between a source and the DSP task 164, direct memory access transactions are used. However, it should be noted that other methods of transferring data streams can be used as known by those skilled in the art. From hereon, the term DMA shall indicate the method of transferring data. The driver 168 sends a message to inform the DSP task 164 to prepare for a DMA transaction (MapDataTransfer). The message may include a pointer to an I/O request packet, an indication of whether to perform a Read DMA transaction (KSDSP_MSG_READ_STREAM) or a Write DMA transaction (KSDSP_MSG_WRITE_STREAM), a pointer to an allocated message frame or a pointer to receive the resultant message frame, a pointer to a buffer for the DMA transfer and the size of the buffer used for the DMA transfer. Other message specific parameters such as the identification of the target channel may also be sent in this message. Alternatively, this message can allocate an I/O request packet or a message frame (AllocateMessageFrame) or both an I/O request packet and message frame. The platform driver 154 receives this message and translates the message, if necessary, into the format required by the DSP task 164. Preferably, the platform driver 154 prepares the buffer for the transfer. The platform driver 154 then sends the appropriate message to the DSP task 164 to put the DSP task 164 in a run mode for the DSP task 164 to perform the DMA transfer (KSDSP_MSG_SET_CHANNEL_STATE).

The DSP task 164 performs the operation that it was requested to do by the driver 168. The DSP task 164 then notifies the platform driver 154 that the operation is complete and the platform driver sends a message using the methods above to inform the driver 168 that the operation is complete. The data is then transferred back via a DMA transaction as described above. However, if there is another task on the DSP 150 that will receive the output from the DSP task 164, the driver 168 commands the platform driver to send the output of the DSP task 164 to the input pin of the other task on the DSP 150 (SetTargetChannel). This command message includes an identifier for the output pin of the DSP task 164 and the target channel that is to receive the data from the DSP task 164. The platform driver 154 then sends a command to the DSP operating system 150 to transfer the data to the other task (KSDSP_MSG_SET_TARGET_CHANNEL). Once the DMA transfer is complete, the driver 168 can send a command to the platform driver to release, or unmap, the buffers used in the DMA transfer (UnmapDataTransfer).

The driver 168 then sends a command to close the data channel if no further data is to be processed by the DSP task 164 (CloseDataChannel). The platform driver 154 then issues a command to close the data channel to the DSP task 164 (KSDSP_MSG_CLOSE_DATA_CHANNEL). Once all DSP operations have been completed for a particular task, the connection to the DSP task 164 is closed. The platform driver commands the DSP to free the task (KSDSP_MSG_FREE_TASK).

All of the references cited herein, including appendices, patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

Appendix 1                                                                                    Page 1

| Command | Description | Parameters |
|---|---|---|
| Initialize<br><br>Initialize(<br>   IN PDEVICE_OBJECT PhysicalDeviceObject,<br>   IN PDEVICE_OBJECT NextDeviceObject<br>); | Sets the I/O device object from the result of the attachment to the Physical Device Object. Methods in this interface that require that the physical device object be set will return STATUS_INVALID_PARAMETER until this method is called. | *PhysicalDeviceObject* – The physical device object as supplied to the device driver.<br><br>*NextDeviceObject* – The result of the attachment of the functional device object to the physical device object (PDO) supplied to the driver. This is normally the same physical device object unless a filter is attached to the PDO. |
| CreateDspControlChannel<br><br>CreateDspControlChannel(<br>   OUT PIKSDSPCONTROLCHANNEL *ControlChannel,<br>   IN PUNKNOWN UnkOuter OPTIONAL<br>); | Creates a DSP control channel associated with the physical device object. To create a DSP control channel object, KSDSP calls the platform via IKsDspIo to load the task as specified by the Module value in the device registry key.<br>On success, a pointer to the specific IKsDspControlChannel instance associated with the DSP task is returned. | *ControlChannel* – Pointer to a pointer to receive the resultant interface.<br><br>*UnkOuter* – Pointer to a controlling unknown. |
| RegisterAutomationTable<br><br>typedef enum {<br><br>KSAUTOMATION_CONTEXT_FILTER,<br><br>KSAUTOMATION_CONTEXT_PIN,<br><br>KSAUTOMATION_CONTEXT_NODE_CONTROL<br>} KSAUTOMATION_CONTEXT;<br><br>typedef NTSTATUS<br>(*PFNGETAUTOMATIONCONT | Registers Retrieves an automation table from the module. | *AutomationTable* – Pointer to the automation table to merge with the table supported by this module.<br><br>*MergedAutomationTable* – Pointer to the receive the resultant merged table.<br><br>*Bag* – Optional pointer to a KSOBJECT_BAG to be used when merging automation tables.<br><br>*GetAutomationContext* – |

Appendix 1                                                                Page 2

| | | |
|---|---|---|
| EXT)( PIRP Irp, KSAUTOMATION_CONTEXT ContextType, PVOID *Context );<br><br>interface IksAutomationExtension: public Iunknown<br>{<br>   STDMETHODIMP RegisterAutomationTable(<br>    IN PKSAUTOMATION_TABLE AutomationTable,<br>    OUT PKSAUTOMATION_TABLE *MergedAutomationTable,  IN PFNGETAUTOMATIONCONTEXT GetAutomationContext<br>   );<br>};<br><br>STDMETHODIMP RegisterAutomationTable(<br>   IN PKSAUTOMATION_TABLE AutomationTable,<br>   OUT PKSAUTOMATION_TABLE *MergedAutomationTable,<br>   KSOBJECT_BAG Bag OPTIONAL,<br>   IN PFNGETAUTOMATIONCONTEXT GetAutomationContext<br>); | | Pointer to client's function to obtain a private context pointer for a given handler.<br><br>*KSAUTOMATION_CONTEXT_FILTER*<br><br>Retrieve filter context pointer<br><br>*KSAUTOMATION_CONTEXT_PIN*<br><br>Retrieve pin context pointer<br><br>*KSAUTOMATION_CONTEXT_NODE_CONTROL*<br><br>Retrieve node context pointer |
| AllocateMessageFrame<br><br>AllocateMessageFrame(<br>   IN KSDSP_MSG MessageId,<br>   IN ULONG MessageDataLength,<br>   OUT PVOID *MessageFrame<br>); | Allocates memory for a message frame from the DSP platform that is appropriate for message transfers with the platform hardware. For example, the reference design platform driver builds an I/O pool using HalAllocateCommonBuffer( ) to guarantee that messages that stride page boundaries are physically contiguous. | *MessageId* – Message identifier<br><br>*MessageFrame* – Pointer to receive resultant message frame<br><br>*MessageDataLength* – Specifies the length of the data element for the given message identifier. The platform driver is expected to adjust the allocation length as necessary and then return |

Appendix 1                                                                                          Page 3

| | | |
|---|---|---|
| | | a pointer to the client's usable portion of the actual physical message frame. |
| PrepareChannelMessage<br><br>PrepareChannelMessage(<br>   IN OUT PIRP *Irp,<br>   IN KSDSPCHANNEL Channel,<br>   IN KSDSP_MSG MessageId,<br>   IN OUT PVOID *MessageFrame,<br>   IN OUT PULONG MessageDataLength,<br>   IN ULONG Flags,<br>   ...<br>); | Prepares a message for a transaction with the DSP platform. Optionally, this method will allocate an I/O request packet and a message frame. KSDSP calls the platform driver to fill in the actual message for the specific platform. KSDSP abstracts communication with the DSP platform with a message set. | *Irp* – If KSDSP_PREPAREMESSAGEF_ALLOCATE_IRP is specified, this is a pointer to receive the resultant IRP, otherwise this must point to an I/O request packet previous allocated using IoAllocateIrp().<br><br>*Channel* – Target channel to receive the message.<br><br>*MessageId* – KSDSP message identifier.<br><br>*MessageFrame* – If KSDSP_PREPAREMESSAGEF_ALLOCATE_FRAME is specified, this is a pointer to receive the resultant message frame, otherwise this must be a pointer to the message frame with sufficient storage for the message as allocated via AllocateMessageFrame().<br><br>*MessageDataLength* – Specifies the length of the data element for the given message identifier. The platform driver is expected to adjust the allocation length as necessary and then return a pointer to the client's usable portion of the actual physical message frame.<br><br>*Flags* – A combination of one or more of the following flags:<br>*KSDSP_PREPAREMESS* |

Appendix 1                                                                 Page 4

| | | |
|---|---|---|
| | | *AGEF_ALLOCATE_IRP:* Allocates the I/O request packet for this message. *PREPAREMESSAGEF_ALLOCATE_FRAME:* Allocate the message frame for this message. |
| PrepareMessage<br><br>PrepareMessage(<br>   IN OUT PIRP *Irp,<br>   IN KSDSP_MSG MessageId,<br>   IN OUT PVOID<br>*MessageFrame,<br>   IN OUT PULONG<br>MessageDataLength,<br>   IN ULONG Flags,<br>   ...<br>); | Prepares a message for a transaction with the DSP platform. The method performs the same actions as PrepareChannelMessage() but the message is directed to the platform instead of a specific control or data channel. | Same as PrepareMessageChannel(), except *Channel* is not specified. |
| MapDataTransfer<br><br>MapDataTransfer(<br>   IN OUT PIRP *Irp,<br>   IN KSDSPCHANNEL Channel,<br>   IN KSDSP_MSG MessageId,<br>   IN OUT PVOID MessageFrame,<br>   IN PVOID Buffer,<br>   IN ULONG BufferLength,<br>   IN ULONG Flags<br>); | Prepares a message for a DMA transaction with the DSP platform. Optionally, this method will allocate an I/O request packet and a message frame. KSDSP calls the platform driver to fill in the actual message for the specific platform. The platform driver prepares the message frame, any platform specific members is the message frame for communication with the platform and map the I/O buffer for scatter/gather DMA as required by the platform. | *Irp* – If KSDSP_MAPDATATRANSFERF_ALLOCATE_IRP is specified, this is a pointer to receive the resultant IRP, otherwise this must point to an I/O request packet previous allocated using IoAllocateIrp().<br><br>*Channel* – Target data channel to receive the message.<br><br>*MessageId* – KSDSP message identifier, either KSDSP_MSG_READ_STREAM or KSDSP_MSG_WRITE_STREAM.<br><br>*MessageFrame* – If KSDSP_MAPDATATRAMSFERF_ALLOCATE_FRAME is specified, this is a pointer to receive the resultant message frame, otherwise this must be a pointer to the message frame with sufficient storage for the |

Appendix 1                                                                                      Page 5

| | | |
|---|---|---|
| | | message as allocated via AllocateMessageFrame( ).<br><br>*Buffer* – Pointer to buffer to map for the read or write DMA transfer..<br><br>*BufferLength* – Size of the I/O buffer to map for the read or write DMA transfer.<br><br>*Flags* – A combination of one or more of the following flags:<br><br>*KSDSP_MAPDATATRA NSFERF_ALLOCATE_I RP*<br><br>Allocate the I/O request packet for this message<br><br>*KSDSP_MAPDATATRA NSFERF_ALLOCATE_F RAME*<br><br>Allocate the message frame for this message |
| UnmapDataTransfer<br><br>MapDataTransfer(<br>    IN PIRP Irp,<br>); | Unmaps I/O buffers previously mapped using MapDataTransfer. | *Irp* – I/O request packet associated with the message |
| SendMessage<br><br>SendMessage(<br>    IN PIRP Irp,<br>    IN PKEVENT Event,<br>    IN PIO_STATUS_BLOCK IoStatus,<br>    IN ULONG Flags<br>); | Sends a message to the DSP platform. This is the general message communication interface between KSDSP and the DSP platform driver . The I/O request packet for the message must be built using the PrepareChannelMessage(), PrepareMessage(), or MapDataTransfer()methods. | *Irp* – I/O request packet associated with this request.<br><br>*Event* – Optional event to associate with the I/O request packet. If KSDSP_SENDMESSA GEF_KEVENT is specified, the IRP is marked so that the I/O manager will not attempt to dereference this object on completion. If KSDSP_SENDMESSA GEF_SYNCHRONOUS |

Appendix 1

Page 6

| | | |
|---|---|---|
| | | is specified, this parameter is required.<br><br>*IoStatus* – Optional status block to associate with the I/O request packet. If KSDSP_SENDMESSAGEF_SYNCHRONOUS is specified, this parameter is required.<br><br>*Flags* – A combination of one or more of the following flags<br><br>*KSDSP_SENDMESSAGE F_KEVENT*<br>The event parameter is a KEVENT, not allocated by the object manager.<br><br>*KSDSP_SENDMESSAGE F_SYNCHRONOUS*<br>Specifies that this is a synchronous SendMessage operation. KSDSP will wait on the the associated Event, which is signaled on I/O completion. |
| GetMessageResult<br><br>GetMessageResult(<br>   IN PVOID MessageFrame,<br>   OUT PVOID Result<br>   OPTIONAL<br>); | Retrieves the result from the message sent to the DSP platform. This method translates the result codes and resultant data into standard structures as specified by the message result details | *MessageFrame* –<br>Message frame sent to the platform.<br><br>*Result* – Optional pointer to receive the resultant data from the platform. |
| FreeMessageFrame<br><br>FreeMessageFrame(<br>   IN PVOID MessageFrame<br>); | Frees a message frame previous allocated with AllocateMessageFrame to the DSP platform. | *MessageFrame* –Pointer to a memory frame previously allocated using AllocateMessageFrame. |
| LoadResource<br><br>LoadResource(<br>   IN POOL_TYPE PoolType,<br>   IN PUNICODE_STRING | Loads a resource from the given file. | *PoolType* – Specifies the pool type to use when allocating memory for this resource.<br><br>*FileName* – Pointer to a |

Appendix 1                                                          Page 7

| | | |
|---|---|---|
| FileName,<br>    IN ULONG_PTR ResourceName,<br>    IN ULONG ResourceType,<br>    OUT PVOID *Resource,<br>    OUT PULONG ResourceSize<br>); | | UNICODE string of the path to the image file. This image file must be in the Win32 portable executable (PE) format which allows for version stamping, digital signatures and allows a vendor to store multiple task images in a single binary. DSP images should be stored in binary resources of this file.<br><br>*ResourceName* – Specifies the name of the resource. See the remarks section for details.<br><br>*ResourceType* – Specifies the type of the resource. See the remarks section for details.<br><br>For standard resource types, this parameter can be one of the following values:<br><br>*RT_RCDATA*<br>Raw data resource<br><br>*RT_VERSION*<br>Version resource<br><br>*Resource* – Pointer to receive resultant resource.<br><br>*ResourceSize* – Pointer to receive size of the resource |
| GetFilterDescriptor<br><br>GetFilterDescriptor(<br>    IN POOL_TYPE PoolType,<br>    IN PKSFILTER_DISPATCH FilterDispatch,<br>    IN PKSPIN_DISPATCH PinDispatch, | Retrieves the filter descriptor for the device. This routine uses the Plug and Play device object to obtain registry keys from the associated registry path for the installed driver. | *PoolType* – pool type to use when creating the filter descriptor<br><br>*FilterDispatch* – pointer to the filter dispatch table<br><br>*PinDispatch* – pointer to |

Appendix 1                                                                 Page 8

| | | |
|---|---|---|
| OUT PKSFILTER_DESCRIPTOR *FilterDescriptor );  | | the pin dispatch table<br><br>*FilterDescriptor –*<br>resultant filter descriptor if successful |
| DSP Control Channel Interface<br><br>interface IKsDspControlChannel : public IUnknown<br>{<br>   STDMETHODIMP SetGuidTranslationTable(<br>      PKSGUIDTRANSLATION GuidTranslationTable,<br>      ULONG TableEntryCount<br>   );<br><br>   STDMETHODIMP OpenDataChannel(<br>      IN ULONG32 PinId,<br>      OUT PKSDSPCHANNEL DataChannel<br>   );<br><br>   STDMETHODIMP CloseDataChannel(<br>      IN KSDSPCHANNEL DataChannel<br>   );<br><br>   STDMETHODIMP SendPropertyRequest(<br>      IN KSPROPERTY Property,<br>      IN PVOID DataBuffer,<br>      IN OUT PULONG DataLength<br>   );<br><br>   STDMETHODIMP SendMethodRequest(<br>      IN KSMETHOD Method,<br>      IN PVOID DataBuffer,<br>      IN OUT PULONG DataLength<br>   );<br><br>   STDMETHODIMP SetTargetChannel(<br>      IN KSDSPCHANNEL DataChannel, | The DSP control channel inteface defines an interface for communications channels (both control and data) between the host and DSP platform. | |

Appendix 1                                                                 Page 9

| | | |
|---|---|---|
| ```
    IN KSDSPCHANNEL
TargetChannel
    );

STDMETHODIMP
SetChannelState(
    IN KSDSPCHANNEL
DataChannel,
    IN KSSTATE State
    );
};
``` | | |
| SetGuidTranslationTable<br><br>typedef struct tagKSGUIDTRANSLATION<br>{<br>    GUID  Set;<br>    ULONG  Base;<br>    ULONG  TranslationBase;<br><br>} KSGUIDTRANSLATIONENTRY,<br>*PKSGUIDTRANSLATION; | To reduce the code and memory footprint on the DSP platform, GUID translation tables are registered for a given DSP channel using the SetGuidTranslationTable method.<br><br>This method sets the GUID translation table for the I/O interface. The GUID translation table provides a mapping from a GUID value to a 32-bit base value for all sets in the corresponding KS interfaces. This mapping is used for all KSIDENTIFIERs. Because SetGuidTranslationTable must translate all identifier sets to a single 32-bit range, KSDSP makes a general assumption that a single KSIDENTIFIER set spans only a small portion of the 32-bit range and that no identifier set overlaps with any other identifier set when translated given a base value for each set.<br><br>    HRESULT<br>    SetGuidTranslationTable( | *Set* - Specifies the GUID of the KS Identifier set to translate.<br><br>*Base* - Base value to subtract from *KSIDENTIFIER.Id* when performing the translation.<br><br>*TranslationBase* - The 32-bit identifier used as the translation base for the KS Identifier set. All identifers for the class of identifiers specified by *Set* are translated using *KSGUIDTRANSLATION ENTRY.TranslationBase + (KSIDENTIFIER.Id – KSGUIDTRANSLATION ENTRY.Base)* |

Appendix 1                                                                     Page 10

| | | |
|---|---|---|
| | PKSGUIDTRANSLATION GuidTranslationTable, ULONG TableEntryCount );<br><br>Parameters:<br>*GuidTranslationTable* – Pointer to a table of KSGUIDTRANSLATION elements specifying the translation for this I/O interface instance. The table referenced by this pointer must remain valid for the table's usage life. A new translation table can be assigned by calling this method a second time. Specifying NULL revokes GUID translation entirely.<br><br>*TableEntryCount* – Count of KSGUIDTRANSLATION elements in the provided table. | |
| OpenDataChannel<br><br>HRESULT OpenDataChannel(<br>   IN ULONG32 PinId,<br>   OUT PKSDSPCHANNEL DataChannel<br>); | Opens the specified data channel on this instance of the DSP Control Interface. The resultant identifier can be used for transactions with the channel via SendMessage, ReadStream, and WriteStream. | *PinId* –Task specific pin identifier for a given data channel.<br><br>*DataChannel* –Pointer to receive the identifer for the data channel. |
| CloseDataChannel<br><br>HRESULT CloseDataChannel(<br>   IN KSDSPCHANNEL DataChannel<br>); | Closes the specified data channel for this instance of the DSP Control Interface. | *DataChannel* – Data channel to close. |
| SendPropertyRequest<br><br>HRESULT SendPropertyRequest(<br>   IN KSPROPERTY Property,<br>   IN OUT PVOID DataBuffer,<br>   IN OUT PULONG DataLength<br>); | Sends a KSPROPERTY request to the DSP platform. All property requests are processed by the control channel. The DSP platform driver translates the KSPROPERTY structure into a suitable package for the | *Property* – Property identifier. When translating a property request to the DSP platform, KSDSP translates the GUID and indentifier to the a 32-bit message identifier using the GUID mapping |

Appendix 1                                                                Page 11

| | | |
|---|---|---|
| | DSP kernel. | tables. See the SetGuidTranslationTable documentation for further details.<br><br>*DataBuffer*– Pointer to the data buffer associated with the property.<br><br>*DataLength* – This referenced value contains the size of the data buffer and on return must be filled with the returned data length |
| SendMethodRequest<br><br>HRESULT SendMethodRequest(<br>   IN KSMETHOD Method,<br>   IN OUT PVOID DataBuffer,<br>   IN OUT PULONG DataLength<br>); | Sends a KSMETHOD request to the DSP platform. All method requests are processed by the control channel. The DSP platform driver translates the KSMETHOD structure into a suitable package for the DSP kernel. | *Method* – Method identifier. When translating a method request to the DSP platform, KSDSP translates the GUID and indentifier to the a 32-bit message identifier using the GUID mapping tables. See SetGuidTranslationTable for further details.<br><br>*DataBuffer*– Pointer to the data buffer associated with the method.<br><br>*DataLength* – This referenced value contains the size of the data buffer and on return must be filled with the returned data length. |
| SetTargetChannel<br><br>HRESULT SetTargetChannel(<br>   IN KSDSPCHANNEL DataChannel,<br>   IN KSDSPCHANNEL TargetChannel<br>); | Sets the output of a streaming task on the DSP to an input pin of another. This allows the DSP platform to connect the data paths of the stream between DSP tasks. | *DataChannel* – Channel for the output-side of the connection. This must be an "out flow" data channel.<br><br>*TargetChannel*– Target channel to receive the data from *DataChannel*. This must be an "in flow" data channel. |
| SetChannelState | Sets the state of the data | *DataChannel* – Target channel of the state |

Appendix 1                                                                                    Page 12

| | channel to the specified KSSTATE. | change request.<br><br>*State*– Requested operation state as specified according to KSSTATE definitions. |
|---|---|---|
| HRESULT SetChannelState(<br>   IN KSDSPCHANNEL DataChannel,<br>   IN KSSTATE State<br>); | | |
| DSP Platform Bus Interface<br><br>typedef struct _BUS_INTERFACE_KSDSPPLATFORM{<br>   //<br>   // Standard interface header<br>   //<br><br>   USHORT   Size;<br>   USHORT Version;<br>   PVOID Context;<br>   PINTERFACE_REFERENCE InterfaceReference;<br><br>   PINTERFACE_DEREFERENCE InterfaceDereference;<br><br>   //<br>   // KSDSP Platform bus interfaces<br>   //<br><br>   PFNKSDSPMAPMODULENAME   MapModuleName;<br><br>   PFNKSDSPPREPARECHANNELMESSAGE PrepareChannelMessage;<br><br>   PFNKSDSPPREPAREMESSAGE PrepareMessage;<br><br>   PFNKSDSPMAPDATATRANSFER   MapDataTransfer;<br><br>   PFNKSDSPUNMAPDATATRANSFER   UnmapDataTransfer;<br><br>   PFNKSDSPALLOCATEMESSAGEFRAME | | |

Appendix 1                                                              Page 13

| | | |
|---|---|---|
| AllocateMessageFrame;<br>    PFNKSDSPSENDMESSAGE SendMessage;<br><br>PFNKSDSPGETMESSAGERESULT    GetMessageResult;<br><br>PFNKSDSPFREEMESSAGEFRAME    FreeMessageFrame;<br><br>PFNKSDSPGETCONTROLCHANNEL    GetControlChannel;<br><br>}<br>BUS_INTERFACE_KSDSPPLATFORM,<br>*PBUS_INTERFACE_KSDSPPLATFORM; | | |
| InterfaceReference<br><br>    VOID InterfaceReference(<br>        PVOID Context<br>    ); | Required method for the standard bus interface. This method increments a reference count on the instance of the interface. | *Context* – Context as provided in the result in the BUS_INTERFACE_KSDSPPLATFORM structure for the query of the BUSID_KSDSPPlatform interface. |
| InterfaceDereference<br><br>    VOID InterfaceDereference(<br>        PVOID Context<br>    ); | Required method for the standard bus interface. This method decrements a reference count on the instance of the interface. | *Context* – Context as provided in the result in the BUS_INTERFACE_KSDSPPLATFORM structure for the query of the BUSID_KSDSPPlatform interface. |
| GetControlChannel<br><br>    GetControlChannel(<br>        PVOID Context,<br>        IN PVOID TaskContext,<br>        OUT PKSDSPCHANNEL ControlChannel<br>    ); | Returns a control channel identifer given the task context. The control channel identifier distinguishes messages sent to the task and general control of the filter as opposed to specific pin or stream control. | *Context* – Context as provided in the result in the BUS_INTERFACE_KSDSPPLATFORM structure for the query of the BUSID_KSDSPPlatform interface.<br><br>*TaskContext* – an opaque |

Appendix 1                                                                Page 14

| | | |
|---|---|---|
| | | 32-bit value identifying the task on the platform<br><br>*ControlChannel* – resultant channel identifier |
| KSDSP Message Defintions and Structures<br><br>    typedef enum {<br>        KSDSP_MSG_LOAD_TASK,<br>        KSDSP_MSG_FREE_TASK,<br><br>    KSDSP_MSG_OPEN_DATA_CHANNEL,<br><br>    KSDSP_MSG_CLOSE_DATA_CHANNEL,<br><br>    KSDSP_MSG_SET_CHANNEL_STATE,<br>        KSDSP_MSG_PROPERTY,<br>        KSDSP_MSG_METHOD,<br>        KSDSP_MSG_EVENT,<br><br>    KSDSP_MSG_SET_TARGET_CHANNEL,<br><br>    KSDSP_MSG_WRITE_STREAM,<br><br>    KSDSP_MSG_READ_STREAM<br>    } KSDSP_MSG, *PKSDSP_MSG; | The general message set is defined by the following enumeration. These messages may be used directly by the platform or may be translated into platform specific messages in the PrepareMessage() and PrepareChannelMessage() methods of the platform interface. | |
| KSDSP_MSG_LOAD_TASK<br><br>MessageDataLength =<br>(TaskName->Length >> 1) +<br>sizeof( NULL );<br>Status =<br>   PrepareMessage(<br>     &Irp,<br><br>KSDSP_MSG_LOAD_TASK,<br>    &MessageFrame,<br>    &MessageDataLength,<br><br>KSDSP_PREPAREMESSAGEF_ALLOCATE_IRP \| | Loads the specified task and creates a task context (an opaque 32-bit value) to return to the host. | *PUNICODE_STRING TaskName* – a Unicode string containing the task name to load<br><br>Return Value:<br>STATUS_SUCCESS and the result of the message is as described below, otherwise an appropriate error code. |

Appendix 1                                                               Page 15

| | | |
|---|---|---|
| KSDSP_PREPAREMESSAGEF_<br>ALLOCATE_FRAME,<br>    (PUNICODE_STRING)<br>TaskName );<br><br>...<br><br>Status =<br>GetMessageResult( MessageFrame,<br>TaskContext ); | | *PVOID TaskContext*:<br><br>An opaque 32-bit value identifying the task on the platform |
| KSDSP_MSG_FREE_TASK<br><br>MessageDataLength = sizeof(<br>TaskContext );<br>Status =<br>   PrepareMessage(<br>    &Irp,<br>    KSDSP_MSG_FREE_TASK,<br>    &MessageFrame,<br>    &MessageDataLength,<br><br>KSDSP_PREPAREMESSAGEF_<br>ALLOCATE_IRP \|<br><br>KSDSP_PREPAREMESSAGEF_<br>ALLOCATE_FRAME,<br>    TaskContext );<br>...<br>//<br>// Send the message and wait for the result<br>//<br>...<br><br>Status =<br>   GetMessageResult(<br>   MessageFrame, NULL ); | Frees the task associated with the given *TaskContext*. | *TaskContext* – a PVOID as returned by KSDSP_MSG_LOAD_TASK |
| KSDSP_MSG_OPEN_DATA_CHANNEL<br><br>MessageDataLength = sizeof(<br>KSDSPCHANNEL );<br><br>Status =<br>   m_KsDspIo-<br>   >PrepareChannelMessage( | Opens a data channel associated with the given pin identifier. The PinId is an index into the array of pin types as specified in the filter descriptor | *ULONG32 PinId* – the pin identifier associated with the data channel.<br><br>Return Value:<br>STATUS_SUCCESS<br>and the result of the message is as described below, otherwise an |

Appendix 1                                                                                     Page 16

| | | |
|---|---|---|
| &Irp,<br>m_ControlChannel,<br><br>KSDSP_MSG_OPEN_DATA_CH ANNEL,<br>&MessageFrame,<br>&MessageDataLength,<br><br>KSDSP_PREPAREMESSAGEF_ ALLOCATE_IRP \|<br><br>KSDSP_PREPAREMESSAGEF_ ALLOCATE_FRAME,<br>PinId );<br>...<br>//<br>// Send the message and wait for the result<br>//<br>...<br>Status = m_KsDspIo->GetMessageResult( MessageFrame, DataChannel ); | | appropriate error code.<br><br>*KSDSPCHANNEL DataChannel*<br>An identifer uniquely identifying the resultant data channel for this instance of the pin. |
| KSDSP_MSG_CLOSE_DATA_C HANNEL<br><br>MessageDataLength = 0;<br><br>Status =<br>m_KsDspIo-<br>>PrepareChannelMessage(<br>&Irp,<br>DataChannel,<br><br>KSDSP_MSG_CLOSE_DATA_C HANNEL,<br>&MessageFrame,<br>&MessageDataLength,<br><br>KSDSP_PREPAREMESSAGEF_ ALLOCATE_IRP \|<br><br>KSDSP_PREPAREMESSAGEF_ ALLOCATE_FRAME );<br>...<br>//<br>// Send the message and wait for the result<br>// | Closes a data channel previously opened using KSDSP_MSG_OPEN_DAT A_CHANNEL. The message is targeted to the specific data channel and has no other parameters. | |

Appendix 1                                                                                                      Page 17

| | | |
|---|---|---|
| ...<br>Status =<br>   m_KsDspIo->GetMessageResult(<br>MessageFrame, NULL ); | | |
| KSDSP_MSG_SET_CHANNEL_STATE<br><br>KSSTATE State;<br><br>State = KSSTATE_RUN;<br><br>MessageDataLength = sizeof(<br>KSSTATE );<br><br>Status =<br>   m_KsDspIo-<br>>PrepareChannelMessage(<br>    &Irp,<br>    DataChannel,<br><br>KSDSP_MSG_CLOSE_DATA_CHANNEL,<br>    &MessageFrame,<br>    &MessageDataLength,<br><br>KSDSP_PREPAREMESSAGEF_ALLOCATE_IRP \|<br><br>KSDSP_PREPAREMESSAGEF_ALLOCATE_FRAME,<br>    State );<br>...<br>//<br>// Send the message and wait for the result<br>//<br>...<br>Status =<br>   m_KsDspIo->GetMessageResult(<br>MessageFrame, NULL ); | Sets the state of a data channel channel. This message is not valid on control channels. | *KSSTATE State* – state to set the specified data channel<br><br>KSSTATE_STOP<br>This is the initial state of the pin, and represents the mode of least resource usage, but also the most latency to obtain a run state.<br><br>KSSTATE_ACQUIRE<br>This represents the mode at which allocators are negotiated, and resources acquired, though no data may be prerolled in this state.<br><br>KSSTATE_PAUSE<br>This represents the mode of most resource usage, and least latency to a run state, without actually being in a run state. Data may be prerolled in this state. If the state of the filter is queried, and that state is currently paused, the filter may return an error of STATUS_NO_DATA_DETECTED to indicate that this pin does not perform queuing of data when in a paused state. This can allow a graph to move to a run state without waiting for data to be pre-rolled by this pin. |

Appendix 1                                                                 Page 18

| | | |
|---|---|---|
| | | KSSTATE_RUN<br>This is the state in which stream data is actually consumed or produced. |
| KSDSP_MSG_SET_TARGET_CHANNEL<br><br>MessageDataLength = sizeof( KSDSPCHANNEL );<br><br>Status =<br>   m_KsDspIo-<br>   >PrepareChannelMessage(<br>      &Irp,<br>      DataChannel,<br><br>KSDSP_MSG_SET_TARGET_CHANNEL,<br>      &MessageFrame,<br>      &MessageDataLength,<br><br>KSDSP_PREPAREMESSAGEF_ALLOCATE_IRP \|<br><br>KSDSP_PREPAREMESSAGEF_ALLOCATE_FRAME,<br>    TargetDataChannel );<br>...<br>//<br>// Send the message and wait for the result<br>//<br>...<br>   Status =<br>m_KsDspIo->GetMessageResult( MessageFrame, NULL ); | Sets the target of the output of the specified data channel to the target data channel. This message is not valid on control channels. | *KSDSPCHANNEL TargetDataChannel* – target data channel to receive output data |
| KSDSP_MSG_WRITE_STREAM<br><br>Status =<br>   m_KsDspIo->MapDataTransfer(<br>      &Irp,<br>      DataChannel,<br><br>KSDSP_MSG_WRITE_STREAM,<br>      &MessageFrame,<br>      OutputBuffer,<br>      OutputBufferLength,<br><br>KSDSP_MAPDATATRANSFERF | Requests a write operation on the specified data channel for the given address and length. | *PVOID OutputBuffer* – pointer to buffer to write<br><br>*ULONG OutputBufferLength* – size of output buffer |

Appendix 1                                                                                                    Page 19

| | | |
|---|---|---|
| _ALLOCATE_IRP \|<br><br>KSDSP_MAPDATATRANSFERF<br>_ALLOCATE_FRAME );<br>...<br>//<br>// Send the message and wait for the result<br>//<br>...<br>   Status =<br>   m_KsDspIo->GetMessageResult(<br>MessageFrame, NULL ); | | |
| KSDSP_MSG_READ_STREAM<br><br>   Status =<br>   m_KsDspIo->MapDataTransfer(<br>     &Irp,<br>     DataChannel,<br><br>     KSDSP_MSG_READ_STREAM,<br>     &MessageFrame,<br>     InputBuffer,<br>     InputBufferLength,<br><br>     KSDSP_MAPDATATRANSFERF<br>     _ALLOCATE_IRP \|<br><br>     KSDSP_MAPDATATRANSFERF<br>     _ALLOCATE_FRAME );<br>...<br>//<br>// Send the message and wait for the result<br>//<br>...<br>   Status =<br>   m_KsDspIo->GetMessageResult(<br>MessageFrame, NULL ); | Requests a read operation on the specified data channel for the given address and length. | *PVOID InputBuffer* – pointer to buffer to read<br><br>*ULONG InputBufferLength* – size of input buffer |
| Creating the Bus Enum Object<br><br>   Status =<br>     KsCreateBusEnumObject(<br>       L"EPD-TM1",   //<br>   Bus Identifier String<br>       FunctionalDeviceObject,<br>   // PnP Functional Device Object<br>       PhysicalDeviceObject,<br>   // PnP Physical Device Object | To create a demand-load bus enumerator, the device driver calls KsCreateBusEnumObject in the AddDevice processing for its device.<br><br>KsCreateBusEnumObject<br>The demand-load bus | |

Appendix 1                                                                                                           Page 20

| | | |
|---|---|---|
| EpdBuffer->PnpDeviceObject, // Attached device object (result of attaching FDO to PDO), may be different from PDO if filter drivers are present)<br>&TM1BusInterfaceId, // Interface Identifier, registered as a device interface<br>L"Filters" ); // Relative path to store information about demand-load interfaces<br><br>The following I/O controls must be supported by the FDO:<br><br>Case IOCTL_SWENUM_INSTALL_INTERFACE:<br>Status = KsInstallBusEnumInterface( Irp );<br>break;<br><br>case IOCTL_SWENUM_GET_BUS_ID:<br>Status = KsGetBusEnumIdentifier( Irp );<br>break; | enumerator object extends a Plug and Play device by servicing bus enumerator queries via the KsServiceBusEnumPnpRequest function for the given functional device object. This function creates a demand-load bus enumerator object and initializes it for use with the demand-load bus enumerator services.<br><br>Parameters:<br>*BusIdentifier* – A string prefix (wide-character) identifier for the bus such as L"SW" or L"KSDSP". This prefix is used to create the unique hardware identifier for the device such as SW\{cfd669f1-9bc2-11d0-8299-0000f822fe8a}.<br><br>*BusDeviceObject* – The functional device object for this bus. This is the device object created and attached the physical device object for this device. N.B. The first PVOID of the device extension of this device object must be reserved for the resultant demand-load bus enumerator object.<br><br>*PhysicalDeviceObject* – The Plug and Play supplied physical device object for this device.<br><br>*PnpDeviceObject* – Optionally specifies the driver stack to forward Plug and Play IRP's. If this parameter is not specified, the BusDeviceObject is attached to the PhysicalDeviceObject and the resulting device object from that operation is used to | |

Appendix 1																																	Page 21

|  |  |  |
|---|---|---|
|  | forward IRP's.<br><br>*InterfaceGuid* – An interface GUID with which the demand-load bus enum object is associated. This associates the bus with a device interface which is enumerable through Io\* or SetupApi\* services for device interfaces. This allows a driver to expose an interface with which clients (user-mode or kernel-mode) can register new demand-load devices.<br><br>*ServiceRelativePath* – If specified, provides a path where a hierarchy of interfaces and device identifiers is stored. For example "Devices" will store the list of supported intefaces and devices in a path relative to the services key for this bus such as:<br><br>REGISTRY\MACHINE\SYSTEM\CurrentControlSet\Services\SWENUM\Devices<br><br>Return Values:<br>    Returns STATUS_SUCCESS if successful, otherwise an appropriate error code.<br>KsGetBusEnumPnpDeviceObject<br>Returns the associated Pnp Device Object stack to which this device object is attached.<br>Parameters:<br>*DeviceObject* – Device object pointer.<br><br>*PnpDeviceObject* – Pointer resultant device object pointer.<br><br>Return Values:<br>Returns |  |

Appendix 1                                                          Page 22

|  | STATUS_SUCCESS or STATUS_INVALID_PARAMETER. |  |
|---|---|---|

We claim:

1. A computer-readable medium having computer-executable instructions for performing steps for communicating between a first operating system and a second operating system, the steps comprising:

registering with the first operating system;

loading a driver to communicate with an interface provided by the first operating system;

creating at least one communication channel to the communication interface for sending at least one message to the first operating system;

receiving at least one message from the first operating system on the at least one communication channel;

creating at least one data channel to the communication interface;

receiving data from the first operating system on one of the at least one data channel;

sending an identifier for each of the at least one first communication channel to the first operating system; and sending a data identifier for each of the at least one data channel, said data identifier comprising:
  at least one pin identifier to identify at least one physical connection of the second operating system; and
  a data type identifier to identify at least one data format each of said at least one physical connection accepts.

2. The computer-readable medium of claim 1 having further computer-executable instructions for performing the steps of:

creating at least one data channel to the communication interface; and receiving data from the first operating system on one of the at least one data channel.

3. The computer-readable medium of claim 2 wherein the data has a first size, the step of receiving the data comprises computer-executable instructions for performing the steps of:

(i) receiving a control message to map a first buffer located on the first operating system;

(ii) allocating a second buffer having a size sufficient to receive the data of the first size;

(iii) mapping the first buffer to the second operating system; and (iv) transferring the data by a direct memory access operation from the first buffer to the second buffer.

4. The computer-readable medium of claim 2 wherein the step of registering with the first operating system comprises:

identifying at least one task the second operating system can perform;

identifying at least one physical connection of the second operating system;

identifying at least one parameter of each of said at least one physical connection; and identifying at least one driver that communicates with the first operating system.

5. The computer-readable medium of claim 1 having further computer-excutable instructions for performing the step of:

sending an identifier for each of the at least one first communication channel to the first operating system.

6. A method for transferring data between a first operating system and a second operating system, the method comprising the steps of:

(a) receiving, by the first operating system, a listing by the second operating system, the listing comprising:
  (i) a description of at least one task the second operating system can perform; and
  (ii) at least one pin identifier to identify at least one physical connection of the second operating system;

loading, by the first operating system, an interface corresponding to the listing;

receiving, by the first operating system, at least one communication channel identifier from the second operating system, the communication channel identifier providing an identification of each of at least one communication channel created by the second operating system;

sending, by the first operating system, a message to the second operating system on one of the at least one communication channel;

sending, by the first operating system, a first message to the second operating system on one of the at least one communication channels to create at least one data channel;

receiving, by the first operating system, an indication that the at least one data channel has been created;

sending, by the first operating system, a second message to the second operating system to transfer data between the first operating system and the second operating system on one of said at least one data channel; and receiving an indication that data has been transferred.

7. The method of claim 6 further comprising the step of:

sending, by the first operating system, data to at least one of the physical connections.

8. The method claim 6 further comprising the step of:

assigning, by the first operation system, at least one identifier to each of the at least one communication channel.

9. The method of claim 8 further comprising the steps of:

translating, by the first operating system, each of said at least one identifier into at least one task identifier of a length sufficient to identify each of the communication channels; and providing, by the first operating system, said task identifier to the second operating system.

10. The method of claim 6 wherein the data has a first size, the step of sending the data comprises the steps of:

(i) allocating a buffer for transferring the data;

(ii) sending a control message, by the first operating system, to the second operating system to map the buffer for receiving the data of the first size;

(iii) transferring, by the first operating system, the data into the mapped buffer; and (iv) sending a second control message to the second operating system to transfer the data by a direct memory transfer procedure.

11. The method of claim 6 wherein the direct memory transfer procedure is a read operation.

12. The method of claim 6 wherein the direct memory access operation is a write operation.

13. The method of claim 6 wherein the control message comprises:

a message identifier for identifying the message;

a pointer to the buffer; and a data length specifier to specify the first size.

14. The method of claim 6 wherein the control message further comprises:
   (i) a first pointer to an I/O request packet;
   (ii) an identifier to a data channel to receive the data; and
   (iii) a selection of at least one direct memory transfer procedure for transferring the data packet.

15. The method of claim 6 wherein the second operation system is a digital signal processor having an operation system, the step of loading an interface further comprises:
   proving the digital signal processor a capability to demand load at least one task when the digital signal processor loads a driver to communicate with the first operating system.

16. A computer-readable medium having computer-executable instructions for performing the step of:
   exposing an interface for providing communication and data transfers between a first operating system and a second operating system, the interface including:
      an initialize instruction to create an object on one of the first operating system and second operating system;
      a create control channel instruction to create a control channel associated with the object;
      an open data channel instruction to open a data channel on the interface;
      a send message instruction to send a message on one of said data channel and said control channel from one of the first operating system and the second operating system to the other of the first operating system and the second operating system; and
      a close data channel instruction to close the data channel.

17. The computer-readable medium of claim 16 wherein the interface further comprises:
   an allocate message frame instruction to allocate memory on one of the first operating system and the second operating system, the memory having at least a size sufficient for transferring messages on one of said data channel and said control channel; and
   a free message frame instruction to release the memory allocated by said allocate message frame instruction.

18. The computer-readable medium of claim 16 wherein the interface further comprises:
   a map data transfer instruction to prepare a message for a direct memory access transaction between the first operating system and the second operating system.

19. The computer-readable medium of claim 18 wherein the map data transfer instruction comprises:
   (i) identifying a first pointer to a packet of data to be sent;
   (ii) identifying a data channel to receive the data packet;
   (iii) selecting at least one direct memory access transaction procedure for transferring the data packet;
   (iv) allocating at least one buffer having at least a size sufficient for transferring the data packet using the at least one direct memory transfer procedure; and
   (v) identifying a second pointer to said buffer.

20. The computer-readable medium of claim 16 wherein interface further comprises:
   an unmap data transfer instruction to release the at least one buffer allocated by said map data transfer instruction.

21. The computer-readable medium of claim 16 wherein the interface further comprises:
   a get message result instruction to retrieve a result from a first message sent to one of the first operating system and second operating system.

22. The computer-readable medium of claim 21 wherein if the first message has at least one data packet and at least one request for one of the first operating system and the second operating system to perform at least one operation on the at least one data packet to form resultant data:
   the result comprises a result pointer to the resultant data.

23. The computer-readable medium of claim 16 wherein the interface further comprises:
   a prepare channel message instruction to prepare a message having a pre-selected size for a transaction to one of a control channel or a data channel, said prepare channel message instruction comprises:
      (i) specifying a first pointer to a message location;
      (ii) specifying a channel to receive the message;
      (iii) specifying an identifier for the message;
      (iv) specifying a second pointer to at least one allocated buffer, the allocated buffer for transferring the message; and
      (v) specifying the pre-selected size.

24. The computer-readable medium of claim 16 wherein the interface further comprises:
   a prepare message instruction to prepare a message having a pre-selected size for a transaction to one of the first operating system and the second operating system, said prepare message instruction comprises:
      (i) specifying a first pointer to a message location;
      (ii) specifying an identifier for the message;
      (iii) specifying a second pointer to at least one allocated buffer, the allocated buffer for transferring the message; and
      (iv) specifying the pre-selected size.

25. The computer-readable medium of claim 16 wherein the interface further comprises:
   a set target channel instruction to set an output of a first data channel to an input of a second data channel.

26. The computer-readable medium of claim 16 wherein the interface further comprises:
   a load task instruction to load a specified task and create a task context to return to one of the first operating system and the second operating system; and
   a free task instruction to free the task associated with the task context.

27. The computer-readable medium of claim 17 wherein the interface further comprises:
   a prepare message instruction to inform one of the first operating system and the second operating system that the other of the first operating system and the second operating system has a message to be sent.

28. The computer-readable medium of claim 27 wherein the prepare message instruction comprises:
   (i) specifying a first pointer to a message location;
   (ii) specifying an identifier for a message;
   (iii) specifying a second pointer to at least one allocated buffer, the allocated buffer for transferring the message; and
   (iv) specifying a size of the message.

* * * * *